July 24, 1928.
G. T. PARR
1,677,984
ICE CREAM DISHER
Filed July 16, 1923
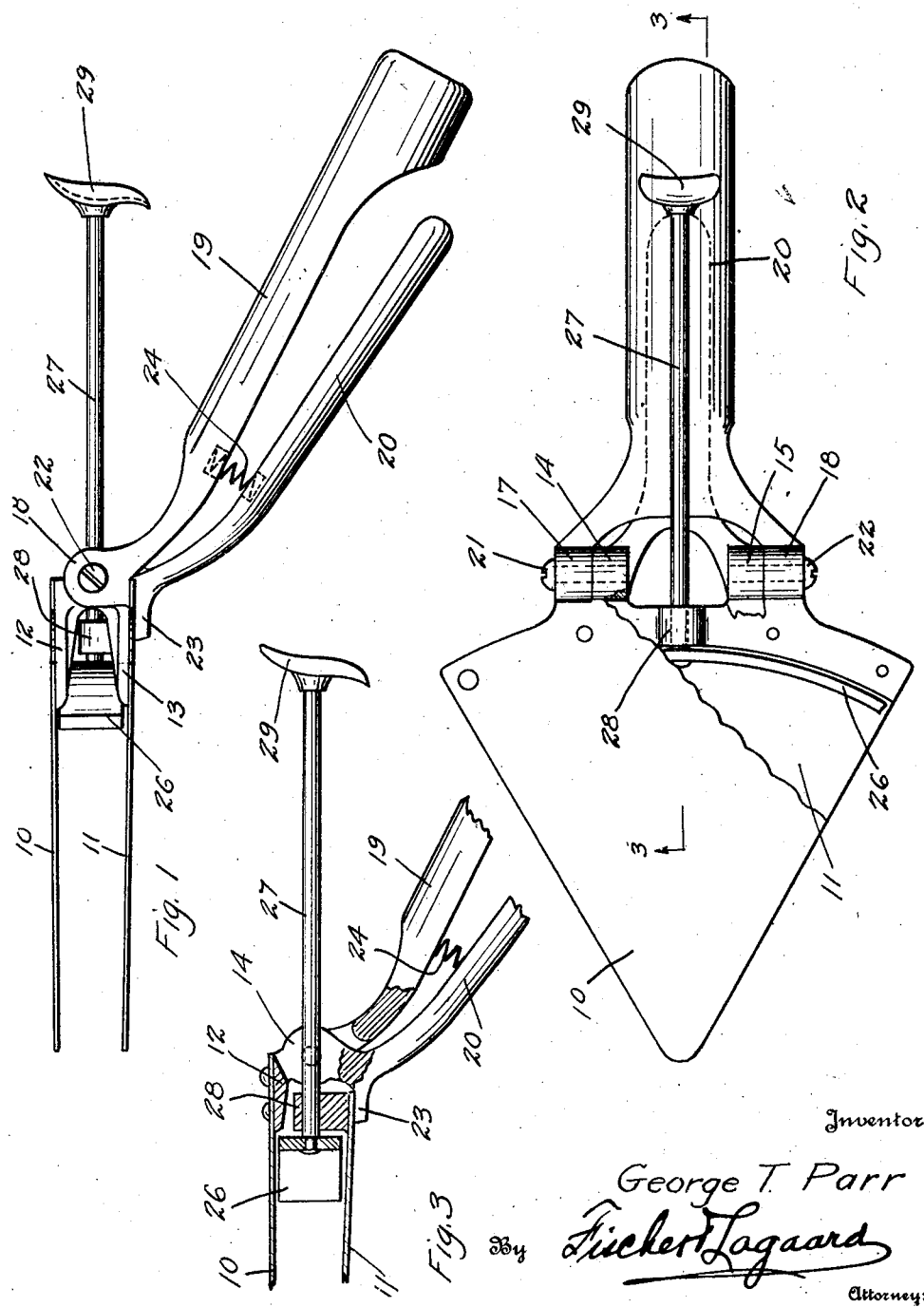
Inventor
George T. Parr
By Fischer Lagaard
Attorneys Patented July 24, 1928.

1,677,984

UNITED STATES PATENT OFFICE.

GEORGE T. PARR, OF ST. PAUL, MINNESOTA.

ICE-CREAM DISHER.

Application filed July 16, 1923. Serial No. 651,722.

My invention relates to ice cream dishers and has for its object to provide a device by means of which the ice cream is retained within the holder after the ice cream has been removed from the bulk to prevent the same from spilling out of the device.

Another object of the invention resides in providing a pair of hinged plates adapted to be brought together to hold the ice cream between the same.

A still further object resides in providing a rigid handle attached to one of said plates and a complemental handle secured to the other of said plates by means of which the device may be used in removing the ice cream from the bulk and by means of which the plates may be brought together to hold the ice cream between the same.

Another object of the invention resides in providing a pair of spaced hinge members for said plates and for providing a plunger adapted to eject the ice cream from between said plates, which plunger passes between said hinged members and is guided in a guideway secured to one of said plates.

Other objects of the invention reside in the detailed construction of the same as brought out in the specification and claims relating thereto.

In the drawings illustrating my application in one form:

Figure 1 is a side elevational view of the device.

Figure 2 is a plan view of the device with a portion of the same cut away to show the construction thereof.

Figure 3 is a sectional view of the invention taken on line 3—3 of Figure 2.

In the use of ordinary ice cream dishers for removing ice cream in slices from the bulk, considerable difficulty has been had in that the ice cream frequently slips out from between the plates by means of which the same is severed, thereby causing waste of time and considerable inconvenience. My invention overcomes these difficulties by providing the disher with a pair of hinged plates which may be brought together to securely hold the ice cream in place.

In the construction of the device illustrated in the drawings, I employ a pair of parallel plates 10 and 11 which may be constructed of any shape into which it is desired to form the slices of ice cream. In this particular instance, I have shown the shape of a piece of pie, though it can readily be understood that other shapes may be employed if desired.

To the arcuate portion of the plates 10 and 11, I attach two arcuate castings 12 and 13 which are positioned between the said plates and are rigidly secured thereto. To the casting 13, I provide two lugs 17 and 18 to which is integrally connected a handle 19 which serves as the principal handle for the device by means of which the same may be manipulated in removing the ice cream from the bulk. Adjoining the lugs 17 and 18, I provide similar lugs 14 and 15, which are connected to the casting 12 and to which is integrally connected a depending handle 20 which extends below the handle 19 and which is adapted to follow along and lie adjacent the same. It will be noted that lugs 14 and 17 are spaced from the lugs 15 and 18 and that the handle portion 20 extends through the space between the lugs 17 and 18 which are connected with the handle 19. These sets of lugs are pivotally connected to form a hinge for the two plates 10 and 11 by means of two screws 21 and 22 which pass through lugs 17 and 18 and are screwed into the lugs 14 and 15. By inspecting Figure 1, it can clearly be seen that the plates 10 and 11 may be brought together by pressing the handle 20 toward handle 19. The plates 10 and 11 are normally held in parallel relation by means of a stop 23 formed on the lever 20 which engages the underside of plate 11 and by means of a coil spring 24 positioned between the said handles. When these handles are pressed together, plates 10 and 11 are caused to come together to hold the ice cream which may be positioned between the same. When the said handles are released, the same spread apart to the position shown in Figure 1 releasing their grip upon the ice cream within the same.

For removing the ice cream from the disher, I provide an arcuate ejector 26 which is secured upon the end of a plunger 27. This plunger is journalled in an upstanding ear 28 formed on the casting 13, which ear is so positioned that the plunger 27 passes through the space between the lugs 14 and 15 of the hinge construction of plates 10 and 11. Upon the end of plunger 27 is attached a thumb piece 29 by means of which the said plunger and ejector 27 and 26 may be operated.

In using the device, the same is grasped by the handles 19 and 20 and the plates 10 and 11 forced into the bulk ice cream. By moving these plates laterally, the ice cream is broken away at the edges leaving the same free to be removed. By now pressing the handles 19 and 20 together, blades 10 and 11 are brought to bear upon the slice of ice cream which has been severed and which is positioned between the same so that the said slice may be quickly and effectively removed without danger of slipping out from the plates after the same is raised above the bulk of the ice cream. When it is desired to discharge the slice of ice cream, the handle 20 is released which causes the plates 10 and 11 to again spread apart to parallel relation, leaving the slice of ice cream free between the same so that the said slice may be conveniently removed. By now pressing upon the thumb piece 29, plunger 27 may be advanced along its guideway 28 so that the ejector 26 bears upon the end of the slice of ice cream causing the same to be forced out of the disher and to be deposited where required.

The advantages of my invention are manifest. An extremely simple and useful device is provided by means of which ice cream may be dished out in slices in an effective and rapid manner, which slices may be deposited where required. The handle of the device may be cast in one piece with the hinge construction so that a minimum number of parts is required in the construction, making the same exceedingly simple and economical to manufacture.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. An ice cream disher comprising a pair of normally parallel plates, a pair of arcuate attaching members secured to said plates, hinge members formed on said attaching members for hingedly connecting said plates together and handles for moving said plates relative to one another, said hinge members being spaced apart, a plunger operable between said hinge members and extending between said plates and an ejector secured to the end of said plunger.

2. An ice cream disher comprising a bottom plate, an attaching member secured thereto, a handle connected with said attaching member, hinge lugs formed on said attaching member in spaced relation to one another, forming an opening through said attaching member adjacent the point of issuance of the handle therefrom, a second plate positioned above said first plate, an attaching member formed on said second plate, hinge lugs formed on said second attaching member, pintles passing through pairs of said attaching lugs for hingedly connecting said plates together, a second handle connected with said second attaching member, said second handle passing through the opening in said first attaching member, an ejector positioned between said plates and a plunger attached thereto and passing between said hinge lugs.

3. An ice cream disher comprising a pair of normally parallel segmental shaped plates, a pair of arcuate attaching members secured to the arcuate portions of said plates between the same, spaced hinge lugs formed on said attaching members and pintles passing through said hinge lugs for hingedly connecting said plates together, a handle having a forked portion connected to two of said hinge lugs, a second handle having a forked portion connected to the other of said hinge lugs and positioned between the forked portion of said first handle, said first handle extending obliquely downwardly from said disher and said second handle following along said first handle in spaced relation thereto.

4. An ice cream disher comprising a pair of normally parallel segmental shaped plates, a pair of arcuate attaching members secured to the arcuate portions of said plates between the same, spaced hinge lugs formed on said attaching members and pintles passing through said hinge lugs for hingedly connecting said plates together, a handle having a forked portion connected to two of said hinge lugs, a second handle having a forked portion connected to the other of said hinge lugs and positioned between the forked portion of said first handle, said first handle extending obliquely downwardly from said disher and said second handle following along said first handle in spaced relation thereto, a stop formed on said second handle adapted to engage the plate to which said second handle is attached for limiting the movement of said plates and a coil spring positioned between said handles.

GEORGE T. PARR.